United States Patent [19]

Titus, IV

[11] 4,261,021
[45] Apr. 7, 1981

[54] CASSETTE LABELING APPARATUS

[75] Inventor: Theodore Titus, IV, Tucker, Ga.

[73] Assignee: Lanier Business Products, Inc., Atlanta, Ga.

[21] Appl. No.: 30,551

[22] Filed: Apr. 16, 1979

[51] Int. Cl.³ .................... G11B 23/40; G11B 31/00
[52] U.S. Cl. .................................. 360/79; 360/93; 369/27; 369/50
[58] Field of Search .......................... 360/79–80, 360/132, 93, 92, 15, 71; 242/199; 179/100.1 DR, 100.1 TC

[56] References Cited

U.S. PATENT DOCUMENTS

| | | | |
|---|---|---|---|
| 3,394,899 | 7/1968 | Schoenmakers | 242/199 |
| 3,760,124 | 9/1973 | Gaven | 360/79 |
| 3,990,710 | 11/1976 | Hughes | 360/79 |
| 4,024,354 | 5/1977 | Bolick, Jr. et al. | 179/100.1 DR |
| 4,075,669 | 2/1978 | Louzil et al. | 360/92 |
| 4,138,695 | 2/1979 | Bolick, Jr. et al. | 360/92 |
| 4,141,045 | 2/1979 | Sheehan | 360/15 |

Primary Examiner—Alfred H. Eddleman
Attorney, Agent, or Firm—Jones, Thomas & Askew

[57] ABSTRACT

Apparatus for automatically printing visible information on the body of a cassette used in a central dictation system is disclosed. The central dictation system includes means for assigning a serial or index number to each cassette upon which dictation has been recorded. Apparatus disclosed herein prints visible indicia of the code on the body of the cassette as it is ejected from the recorder. Another embodiment records a code corresponding to the serial number on the recording medium of each cassette. The second embodiment is associated with a playback apparatus at a central control unit and prints a visible indication of the serial number on a label provided on the cassette in response to the playback head transducing the recorded code.

9 Claims, 5 Drawing Figures

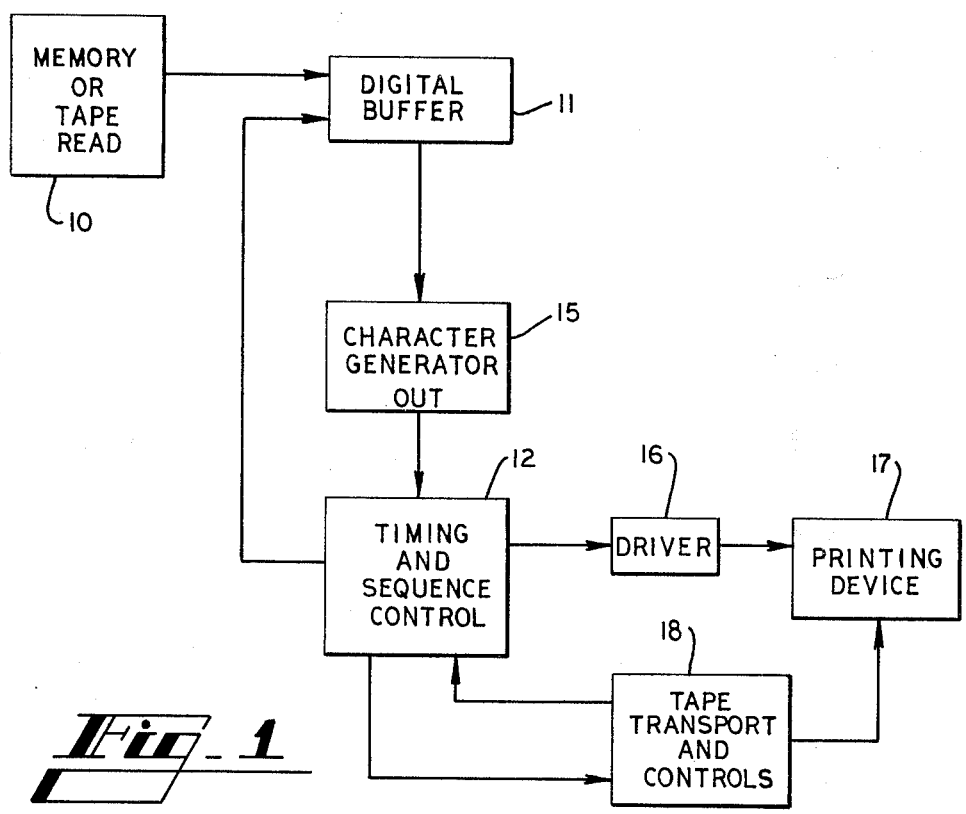
Fig. 1
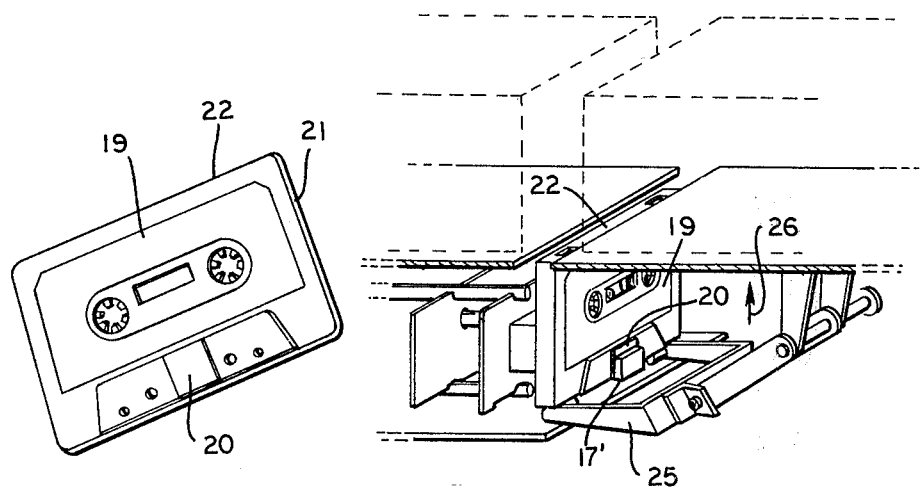
Fig. 2
Fig. 3

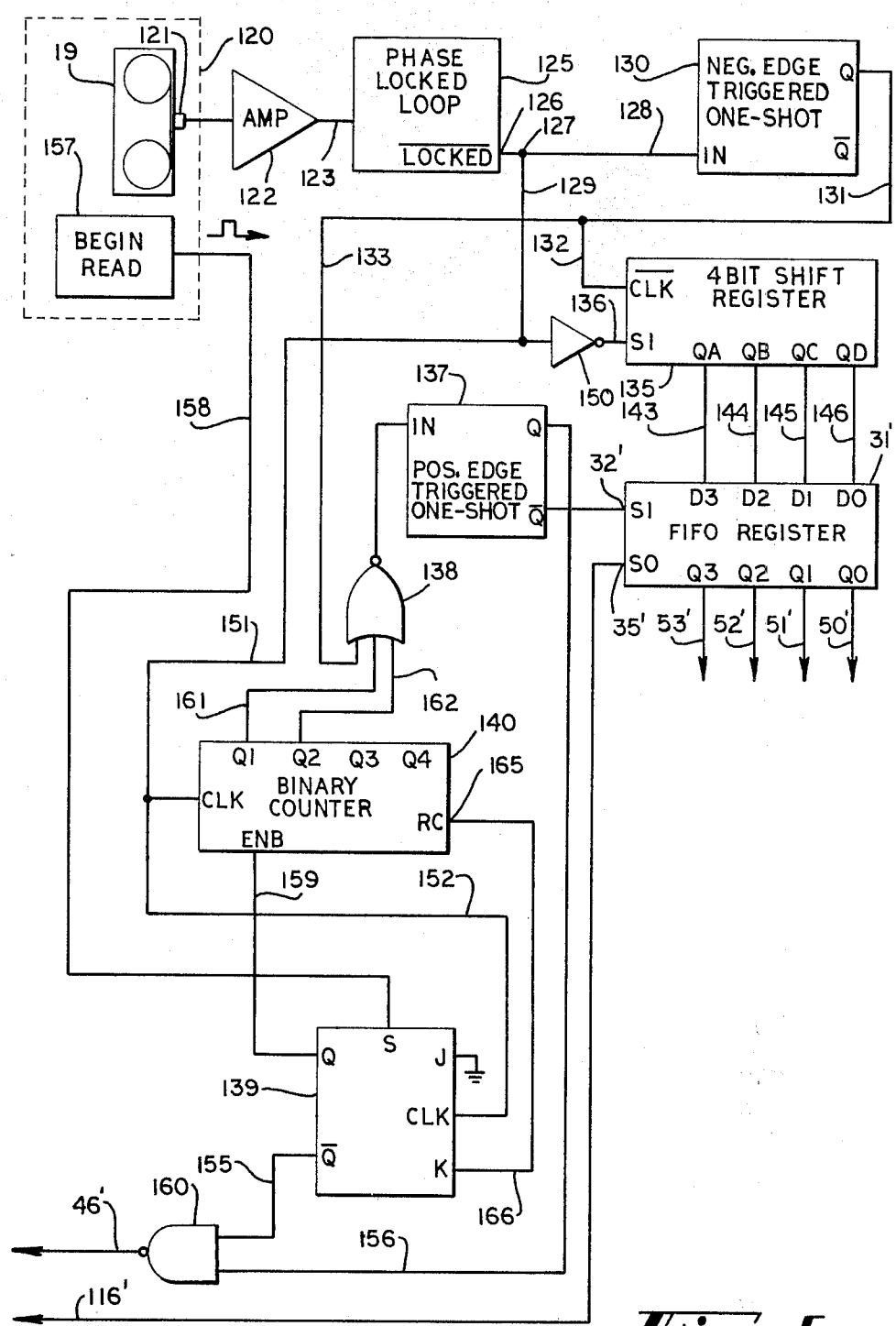
Fig_5

CASSETTE LABELING APPARATUS

DESCRIPTION

Technical Field

The present invention relates to tape cartridge recording systems and more particularly to cassette format central dictation recording systems.

BACKGROUND OF THE INVENTION

Since the advent of central dictation systems which employ discrete tape carriers such as cassettes, various approaches to the problem of identifying individual cassettes have been tried. In both central dictation systems, and office systems employing individual cassette dictation recorders direct labeling of each cassette with a distinct number has been common practice.

This type of system presents several disadvantages, one of which is that when dictation is recorded on a particular cassette, there is not necessarily any relationship between the cassette number and the time sequence in which the dictation recorded thereon occurred. Furthermore in many dictation systems, it has been necessary to maintain an external log to identify which segments of dictation are recorded on any particular cassette.

In the central dictation system disclosed in copending application Ser. No. 782,947 now abandoned filed Mar. 30, 1977 which is assigned to the same assignee as the present invention, a central control unit assigns a sequential serial or index number to each cassette as it is ejected from the cassette recorders shown therein. A coded equivalent signal of this number is recorded on the tail end of the recording medium of each cassette. Application Ser. No. 782,947 shows a central unit which has a playback cassette reader associated therewith that will read the recorded code from each cassette and print a label usually displaying the serial or index number. This requires the operator of the central unit to remove the cassette from the playback reader and manually apply the printed label to the outer surface of the cassette.

SUMMARY OF THE INVENTION

It is an object of this invention to provide apparatus which may be located in a dictation recorder for printing visible information on a cassette.

It is another object of this invention to provide means of printing a visible indicium of an assigned serial number on a tape carrier as it is ejected from a tape recorder.

It is a further object of this invention to provide apparatus which will read a serial number or index code recorded on the recording medium of a tape carrier and in the same operation place visible indicia on the outer surface of the tape carrier corresponding to the serial or index number recorded on said recording medium.

It is a further object of this invention to provide a printer for printing visible indicia on a heat sensitive label disposed on the outer surface of a tape carrier by means of a thermal write head, and in which the motion imparted to the tape carrier by an ejection apparatus associated with a tape recorder moves the heat sensitive label past the thermal write head during its writing operation.

The present invention accomplishes these objectives by providing cassette recording apparatus in which a serial or index number is assigned to each cassette, using decoding means to convert the serial or index number to a code representing alpha numeric symbols which will be meaningful to the users of the present invention and directly writing said alpha-numeric symbols on a label or other appropriate print acceptor disposed on the outer surface of the cassette while the cassette is being ejected from the recording apparatus.

The preferred embodiment is used in conjunction with heat sensitive cassette labels and employs a thermal write head for printing thereon. The motion imparted to the cassette by operation of an ejection means of the apparatus is used to move the heat sensitive label past the thermal write head so that a line-by-line printing of a dot matrix code may be used in the printing operation.

An alternate embodiment of the present invention reads a code from the recording medium of a cassette and prints a label on the body of a cassette as it is ejected from a playback apparatus.

BRIEF DESCRIPTION OF THE DRAWINGS

FIG. 1 is a block diagram of the present invention.

FIG. 2 is a pictorial view of a cassette for use in the preferred embodiment of the present invention.

FIG. 3 is a pictorial view of a changing apparatus in which the present invention is used.

FIG. 5 shows circuitry associated with the preferred embodiment of the present invention in an environment where its input signals are recorded on a tape carrier having dictation recorded thereon.

DETAILED DESCRIPTION OF THE PREFERRED EMBODIMENT

Figure 4:
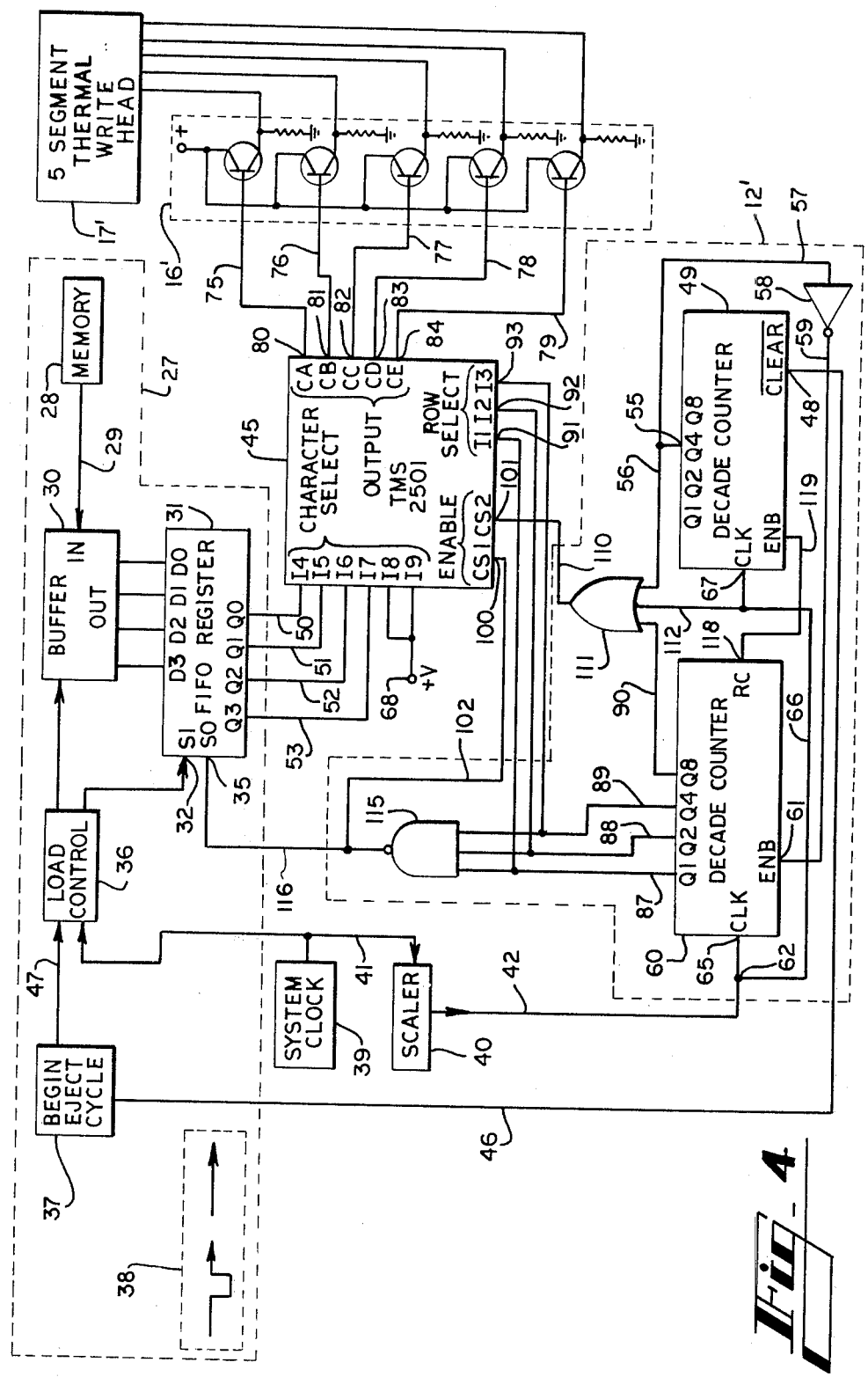
FIG. 4 is a schematic diagram of the preferred embodiment of the present invention shown in an environment wherein its input signals are derived from a remote memory unit.

The present invention is useful in any environment using discrete tape carriers and having signals corresponding to visible indicia and in which it is desirable to provide the visible indicia on the outer surface of the tape carrier.

The present invention is particularly useful in the environment of a central dictation recording system using discrete tape cassettes as the recording members thereof. As will be apparent to those skilled in the art, the present invention is also useful in any environment using discrete tape carriers wherein it is desirable to provide the visible indicia on the outer surface of the tape carrier which corresponds to the information recorded on the recording medium of the tape carrier.

As disclosed herein, the present invention is used in an environment wherein a memory device provides digital signals corresponding to the visible indicia to be printed on the tape carrier. The first disclosed environment is one in which these digital signals are provided directly from memory to be recorded upon a label on the outer surface of the tape cassette. The second environment shown herein is one in which signals are recorded on the tape of the tape cassette immediately following recorded dictation. In this environment apparatus is provided for transducing these signals and providing them as digital signals to the preferred embodiment.

In the central dictation system disclosed in co-pending application Ser. No. 782,947 now abandoned filed Mar. 30, 1977 which is assigned to the same assignee as the present invention a central control unit assigns a sequential serial or index number to each cassette as it is ejected from the cassette recorders shown therein. As shown in said co-pending application, a coded equivalent signal of this number is recorded on the tail end of the recording medium of each cassette. The present disclosure shows apparatus which will provide visible indicium of this index number on a label disposed on each cassette both directly upon ejection from a cassette recorder and also upon reading from the tail end of the recording medium by a tape reader such as that disclosed in co-pending application Ser. No. 782,947.

FIG. 1 shows a block diagram of the present invention. Block 10 shows that a memory device or signals recorded on tape are contemplated as the source of digital signals for the present invention. However, it will be apparent to those skilled in the art that such signals could be provided from a key pad or other signal source at a dictate station directly to a desk top cassette recording unit. The output of memory or tape read 10 is provided to digital buffer 11 which arranges the digital signals into groups each of which correspond to a decimal digit. In the preferred embodiment the output of digital buffer 11 is the first four bits of the United States ASCII code but, of course, other coding schemes may be used. The operation of the preferred embodiment of the present invention is controlled by timing and sequence control circuitry 12. The timing and sequence control circuitry is shown as controlling the output of digital buffer 11 to a character generator 15 and further as controlling the sequence in which the output of character generator 15 is provided to a driver 16 which drives printing device 17.

In the preferred embodiment of the present invention the timing and sequence control 12 is responsive to tape and transport controls shown as block 18, and in the environment shown herein in FIG. 5 provides signals which control tape transport and controls 18.

In the preferred embodiment of the present invention, printing device 17 is a five segment thermal write head. It is of course possible to use another printing device in the construction of an embodiment of the present invention and the terms "head" and "print head" will be understood to include other devices which produce visible marks on a corresponding print-receptive medium.

FIG. 2 shows a pictorial view of a tape cassette such as that described in U.S. Pat. No. 3,394,899. In the preferred embodiment shown herein, cassette 19 has disposed on its outer surface a heat sensitive label 20. While it is necessary for label 20 to be disposed as shown in FIG. 2 in the preferred embodiment of the present invention disclosed herein, it will be apparent that such a label may be disposed anywhere on the surface of cassette 19 such as edges 21 or 22, and that disposition of the label on cassette 19 will be dictated by the location of the printing device used in a particular embodiment.

FIG. 3 shows a cassette changer for use in a central dictation system. Such a cassette changer is described in U.S. Pat. No. 4,024,354 which is assigned to the same assignee as the present invention. The preferred embodiment of the present invention uses a five segment thermal wire head 17' as its printing device which corresponds to printing device 17 shown in FIG. 1. As is described in U.S. Pat. No. 4,024,354, when the cassette changer shown in FIG. 3 ejects a cassette, arm 25 lifts cassette 19 in the direction shown by arrow 26 in FIG. 3.

The preferred embodiment of the present invention uses the motion imparted to cassette 19 by arm 25 during ejection as the motion which brings the five segments of thermal write head 17' into contact with different portions of heat sensitive label 20. However, it will be apparent to those skilled in the art that an embodiment of the present invention may be constructed using a more complex printing device than five segment thermal write head 17' which will render motion of cassette 19 during a writing operation unnecessary.

Turning to FIG. 4, the circuitry providing control signals to thermal write head 17' will now be explained.

As shown in FIG. 4, thermal write head 17' is driven by driver 16' which corresponds to driver 16 shown in FIG. 1. Driver 16' includes one transistor for each segment of thermal write head 17'. The transistors comprising driver 16' are provided to assure that sufficient current is available to thermal write head 17' to operate it properly.

Block 27 of FIG. 4 shows a first source of digital signals for the present invention. Within this block is memory 28 which is connected by line 29 to buffer 30. A four bit output of buffer 30 is provided to FIFO register 31. As will be known to those skilled in the art, FIFO register 31 is a device which may be embodied by an integrated circuit such as the currently available CMOS 40105B type. FIFO register 31 is four bits wide and must be at least four bits deep for use in the preferred embodiment of the present invention. FIFO register 31 includes a SHIFT IN (SI) input 32 which will shift the data present at data inputs D0–D3 into the register when a logical one condition immediately following a logical zone condition exists at SHIFT IN input 32. As will be known to those skilled in the art, each four parallel bits shifted into FIFO register 31 at inputs D0–D3 will ripple through the device and appear in the same order as shifted into the register at outputs Q0–Q3. It will therefore be appreciated that FIFO register 31 in the embodiment shown corresponds to digital buffer 11 shown in FIG. 1. FIFO register 31 also includes a SHIFT OUT (SO) input 35 which will shift out the data located on outputs Q0–Q3 in response to the presence of a falling edge on SHIFT OUT input 35.

Block 27 also includes a load control 36 and a begin eject cycle pulse generator 37. Memory 28, buffer 30 and load control 36 all comprise part of the memory of a central dictation system such as that disclosed in co-pending application Ser. No. 782,947. It is only necessary that digital signals from memory 28 be loaded into FIFO register 31 in a sequence controlled by load control 36. Begin eject cycle pulse generator 37 provides a negative going pulse shown in block 38 when the eject cycle from a recorder such as that shown in FIG. 3 begins. Implementation of such a generator will be apparent to those of ordinary skill in the art.

The environment of the preferred embodiment of the present invention also includes a system clock 39 which is connected to scaler 40 by line 41. As will be apparent to those of ordinary skill in the art, scaler 40 may be embodied by a modulo-N counter which provides one clock pulse on line 42 in response to each N clock pulses from system clock 39. Scaler 40 is shown in FIG. 4 only to indicate that the environment of the preferred embodiment of the present invention shown therein is one in which the clocking signals controlling the present invention will normally be a lower frequency than that provided by a system clock for a central control unit.

The preferred embodiment of the present invention uses a conventional five by seven ASCII code (ANSI X3.15-1976) character generator 45 to correspond to the generic character generator 15 shown in FIG. 1. FIG. 4 shows the preferred embodiment implemented using a type TMS 2501 character generator manufactured by Texas Instruments Co. As will be appreciated by those skilled in the art, such character generators respond to a standard six bit code provided at CHARACTER SELECT inputs I4–I9 to provide five column outputs 80–84 ($C_A$–$C_E$) for each row selected by a binary number at ROW SELECT inputs 91–93(I1–I3). When the binary numbers zero (000) through six (110) are sequentially applied to inputs 91–93 seven five bit outputs sequentially appear which form the elements of a five by seven dot matrix.

Character generator 45 also includes a pair of enable inputs 100 and 101 (CS1 and CS2 respectively). When input 100 has a logical one thereon and input 101 has a logical zero thereon, character generator 45 will operate as described above. Unless both these conditions are met all outputs of character generator 45 are equal to zero.

As will be appreciated by those of ordinary skill in the art, standard five by seven character generators are a species of read only memories (ROM) and that an embodiment of the present invention using any coding scheme which may be embodied in a read only memory may be constructed. The choice of a conventional five by seven character generator which corresponds to the ASCII code for the preferred embodiment of the present invention was dictated by convenience and availability as an off-the-shelf item.

The circuitry corresponding to timing and sequence control 12 shown in FIG. 1 is shown within block 12' in FIG. 4. The operation of this circuitry will now be explained.

OPERATION OF THE PREFERRED EMBODIMENT

The environment of the preferred embodiment of the present invention as shown in FIG. 4 assigns a four digit index number to each cassette upon which dictation is recorded in a central dictation system. It is assumed that this number is stored in memory 28 and also provided along line 29 to buffer 30. When a control signal is provided that indicates the beginning of the eject cycle for the cassette recorder, begin eject cycle pulse generator provides a negative going pulse (as shown in block 38) along line 46 and an appropriate signal along line 47 to load controller 36. Load controller 36 will then load the contents of buffer 30 into FIFO register 31. It is of course possible that load control 36 has loaded the contents of buffer 30 into FIFO register 31 sometimes prior to the beginning of the eject cycle. As will be appreciated by those skilled in the art, it is the appearance of negative going pulse on line 46 which begins the sequence of operation for the preferred embodiment of the present invention.

The negative going pulse which appears on line 46 is provided to inverted CLEAR input 48 of decade counter 49. Decade counter 49 may be embodied by an integrated circuit decade counter such as the TTL 54160 counter. The appearance of a logical zero at inverted clear input 48 clears all the flip-flops of decade counter 49 and thus provides a logical zero at the $Q_4$ output 55 of decade counter 49. As will be known to those of ordinary skill in the art, $Q_4$ output 55 corresponds to the third digital bit of decade counter 49 and may be considered "the four's place" in the binary number counting system.

The zero which appears at output 55 appears on lines 56 and 57. The logical zero on line 57 is inverted by inverter 58 which provides a logical one on line 59. Line 59 is connected to ENABLE input (ENB) 61 of a second decade counter 60. As will be known to those of ordinary skill in the art decade counter 60 may be embodied by any number of available off-the-shelf integrated circuit counters including the TTL type 54162. The logical one at ENABLE input 61 allows decade counter 60 to respond to CLOCK pulses appearing at point 62 which is connected to clock (CLK) input 65 of decade counter 60. As will further be appreciated by those of ordinary skill in the art, the presence of a logical zero at enable input 61 will inhibit decade counter 60 from counting. Note also that point 62 connected by line 66 to clock input 67 of decade counter 49. It may therefore be seen that counters 49 and 60 are clocked from the same clock signal.

It is assumed that load control 36 will have loaded the first four bit number into FIFO register 31 in a sequence which will assure that the first four bit number has rippled through to outputs Q0–Q3 of FIFO register 31 at the time that motion of cassette 19, as shown in FIG. 3, begins. Note from FIG. 3 that motion of cassette 19 in the direction of arrow 26 during the eject cycle moves label 20 past thermal write head 17'.

As will be appreciated by those of ordinary skill in the art, the ASCII codes for decimal digits comprise a six bit code in which the two most significant bits are ones and the four least significant bits correspond to a binary coded decimal (BCD) representation of the particular decimal digit. Therefore, the two most significant input bits of character generator 45 (I8–I9) are maintained in a logical one condition as indicated at point 68. The first four bit number to ripple through FIFO register 31 will appear on outputs Q0–Q3 and will be provided along lines 50–53 respectively to the four least significant bit inputs 14–17 of character generator 45. When a BCD representation of a decimal numeral N appears on line 50–53, the column outputs for a row corresponding to the row number appearing on lines 91–93 appear on lines 75–79.

It should be noted that while the preferred embodiment uses a four bit binary code representing an index number on lines 50–53, the present invention is not limited to such a code. The signals appearing on lines 50–53 should be considered generically as print signals which correspond to the visible output to be placed on label 20.

The preferred embodiment of the present invention prints the dots of a dot matrix one row at a time as label 20 moves past thermal write head 17'. This is accomplished by providing character generator 45 with the input code for a particular digit N, at CHARACTER SELECT inputs I4–I7 and providing the column outputs, one row at a time, as write signals to thermal write head 17'.

Recall that upon initiation of the reject cycle, decade counter 60 was enabled to begin its count. The parallel outputs of decade counter 60 are provided along lines 87–90, line 87 carrying the least significant bit and line 90 carrying the most significant bit. Lines 87–89 are provided to ROW SELECT inputs 91–93 respectively of character generator 45. The particular row which is provided at output 80–84 is determined by the three bit binary number appearing on ROW SELECT inputs 91-93. Thus, a condition of all logical zeros on ROW SELECT inputs 91-93 will cause the data appearing on outputs 80-84 to be the column elements of the first row of a particular character determined by the inputs on lines 50—53. The appearance of a logical one on input 91 and logical zeros on inputs 92 and 93 will cause the data appearing on outputs 80-84 to be the column elements of the second row; and so forth until a logical one on inputs 92 and 93 and a logical zero on input 91 causes the seventh row of the character to provided. Since ROW SELECT inputs 91-93 of character generator 45 are connected to the four least significant bits of decade counter 60 by lines 87-89 respectively, it may be seen that the rows of the matrix for a particular character determined by CHARACTER SELECT inputs I4-I7 will be provided sequentially to outputs 80-84 as decade counter 60 counts from zero to six.

As will be apparent from FIG. 4, each of outputs 80-84 is connected to one drive transistor of driver 16' and that a logical one appearing on the output of a particular one of outputs 80-84 will turn on the transistor associated therewith and provide current to the particular segment of thermal write head 17' associated with that transistor. It will therefore be appreciated that when output 80 of character generator 45 is a logical one the first segment of thermal write head 17' will be heated, when output 81 of character generator is a logical one, the second segment of thermal write head 17' will be heated and so forth.

It will therefore be appreciated that as decade counter 60 counts from zero to six, outputs 80-84 of character generator 45 will correspond to the elements of each row of the five by seven dot matrix for the particular decimal digit N, a logical one corresponding to a segment of the matrix which is to be printed and a logical zero corresponding to a blank segment of the matrix. Therefore as label 20, as shown in FIG. 3, moves past thermal write head 17', the segments of thermal write head 17' will be activated to print each row of the five by seven dot matrix, one row at a time.

As noted above character generator 45 includes ENABLE inputs 100 (CS1) and 101 (CS2). As is known to those of ordinary skill in the art, the presence of a logical one at input 101 or a logical zero on input 100 on this type of character generator will cause logical zeros to appear at outputs 80-84 without regard to the logic states present at the other inputs of the generator.

Note that ENABLE input 101 is connected to the output of OR gate 111. OR gate 111 has as inputs thereto lines 56, 90 and line 112 which is connected to line 66 and therefore carries the clock signal present at point 62. Thus it may be seen that whenever the clock signal at point 62 is in its logical one state, a logical one will be provided along line 112 and therefore OR gate 111 will provide a logical one to ENABLE input 101 holding outputs 80-84 of character generator 45 in their logical zero condition. The logical zeros on outputs 80-84 are provided by lines 75-79 to driver 16'. Therefore whenever the clock signal present at point 62 is in its logical one state outputs 80-84 will be in their logical zero states thus assuring that thermal write head 17' will not write. This feature is provided on the preferred embodiment of the present invention in order to space a distance between printed rows as label 20 moves past thermal write head 17'. It will be apparent to those of ordinary skill in the art that scaler 40 or any other source of clock signals may be chosen such that the duty cycle of the clock signal appearing at point 62 assures that a proper spacing between printed rows is provided when ENABLE input 101 is held to its logical one state by the positive portion of the clock signal appearing at point 62.

The above described sequence of printing each row of a five by seven dot matrix representation of decimal digit N continues until decade counter 60 has reached its six (binary 110) count. When decade counter 60 is in its binary 110 state the seventh row of the matrix is provided to outputs 80-84 during the negative portion of the clock signal appearing at point 62 thus causing the last row of the matrix for decimal digit N to be printed. Note that decade counter 60 has seven distinct states (000-110) in its count from zero to six and therefore has selected seven distinct rows at inputs 91-93 during this count.

The next positive going edge of the clock signal appearing at point 62 causes decade counter 60 to count to its seven (binary 111) state. During the positive portion of the clock signal ENABLE input 101 of character generator 45 will be at its logical one state and outputs 80-84 will be in their logical zero state.

When decade counter 60 settles in its seven count state (binary 111) lines 87-88 are all at their logical one state. Since lines 87-89 are the inputs to NAND gate 115, the presence of all ones on lines 87-89 will cause the output of NAND gate 115 which appears on line 116 to go to a logical zero state. As will be known to those of ordinary skill in the art, a seven count is the only state of a decade counter in which the three least significant bits are all equal to one and therefore the only time that line 116 will go to its logical zero state is during the seven count of decade counter 60. Line 116 is connected by line 102 to ENABLE input 100 of character generator 45. Since a logical zero on input 100 disables the character generator, outputs 80-84 will be zero during the seven count of counter 60. Note that line 116 is also connected to SHIFT OUT (SO) input 35 of FIFO register 31. It may therefore be seen that during the seven count of decade counter 60 the entire matrix for the first decimal digit N has been printed and that thermal write head 17' is inhibited from printing due to the presence of a logical zero at input 100.

The next positive going edge of the clock signal to appear at point 62 forces decade counter 60 into its eight (binary 1000) state. In this state line 90 carries a logical one and lines 87 through 89 will all carry logical zeros. The appearance of logical zeros on lines 87-89 causes the logic state of line 116 to fall from one to zero due to the action of NAND gate 115. As noted above, FIFO register 31 is of the type in which a falling edge appearing at SHIFT OUT (SO) input 35 will remove data from outputs Q0-Q3 and shift the next available four bits of data to these outputs. Thus it will be appreciated that when decade counter 60 makes its transition from a seven count to an eight count the BCD representation of decimal digit N which has just been printed by thermal write head 17' will be shifted out of FIFO register 31 and BCD representation of the next decimal digit will appear on lines 50-53.

Note also that during the seven count of decade counter 60 logical zeros were maintained on outputs 80-84 due to the logical zero on input 100. When decade counter 60 counts to its eight count a logical one appears on line 90 which through the action of OR gate 111 is established at ENABLE input 101. Therefore, ENABLE input 101 is maintained in its logical one condition and outputs 80–84 of character generator are maintained in their logical zero condition. Thus it may be seen that when decade counter 60 is in its eight (binary 1000) count the BCD representation of the next decimal digit has appeared as inputs to character generator 45 along lines 50–53 and outputs 80–84 are zero. These conditions are maintained during the nine count of decade counter 60 since line 90 will continue to be at its logical one state thus holding ENABLE input 101 to its logical one state.

It may therefore be seen that during the seven, eight and nine counts of decade counter 60, ENABLE inputs 100 and 101 maintain logical zeros on outputs 80–84 thus inhibiting thermal write head 17' from writing during those states of counter 60. Since it is assumed that label 20 is moving past thermal write head 17' at a substantially constant speed, it will be appreciated that a space equivalent to approximately three rows of a five by seven matrix will be left between consecutive matrixes corresponding to consecutive digits. The modulus of counter 60 could be increased or decreased in a conventional manner and it is therefore to be understood that the selection of three blank rows between matrixes representing consecutive digits is the preferred choice and should in no way limit the scope of the present invention.

Decade counter 60 is of the type which provides a ripple carry (RC) output 118 which goes to a logical one state during the nine count of counter 60. The ripple carry output 118 of counter 60 is provided along line 119 to the ENABLE input (ENB) of decade counter 67 and therefore it may be seen that counter 67 is cascaded with counter 60 in a conventional manner. Upon the next positive going edge of the clock signal appearing at point 62, counter 67 will be enabled and will count from zero to one and counter 60 will count from nine to zero.

Since the BCD representation of the next decimal digit to be printed is already set up on lines 50–53, the printing of the dot matrix corresponding to this digit will occur in exactly the same sequence as the printing of the first digit described above as decade counter 60 counts from zero to six. Again when decade counter 60 undergoes a transition from its seven count to its eight count, a falling edge will appear on line 116 and be provided to SHIFT OUT input 35 of FIFO register 31 and the third BCD number will appear on lines 50–53. On the second transition from nine to zero of decade counter 60, decade counter 49 will count from one to two.

It will therefore be apparent to those of ordinary skill in the art that decade counter 60 will cycle through four complete counts of zero through nine and that upon arriving at its nine count for the fourth time, a logical one will appear on line 119 from ripple carry output 118 thus enabling counter 49. The next positive going transition of the clock signal at point 62 will cause counter 49 to count to its four (binary 100) count and therefore Q4 output 55 of decade counter 49 will become a logical one. The logical one appearing at output 55 is provided along line 56 to OR gate 111 and thus maintains ENABLE input 101 in its logical one state thereby inhibiting thermal write head 17'. The logical one from output 55 is also provided along line 57 to inverter 58 which provides a logical zero along line 59 to ENABLE input 61 of decade counter 60. The logical zero on ENABLE input 61 inhibits counter 60 from counting and thus the entire device remains in a stable state with decade counter 60 at its zero count and decade counter 49 at its four count.

The preferred embodiment of the present invention will remain in this state until the next appearance of a negative going pulse on line 46 which will clear counter 49 thus beginning the sequence of operations described hereinabove.

SIGNALS RECORDED ON THE TAPE

As noted above in the discussion of FIG. 1, the present invention is designed to directly write visible indicia onto a label disposed on a cassette body when an index number is provided from memory. It is also contemplated that the present invention may be used to write a visible indication of an index number which has been recorded onto the medium of cassette 19 when it is placed in the tape reader of a central control unit such as that described in co-pending application Ser. No. 782,947.

FIG. 5 shows circuitry for providing signals to the preferred embodiment of the present invention from a tape reader associated with a central control unit such as that disclosed in co-pending application Ser. No. 782,947 now abandoned. FIG. 5 shows tape reader of a central unit 120 in which cassette 19 has been placed and which includes a playback head 121.

Assume that signals representing the assigned index number for cassette 19 are recorded on the recording medium of cassette 19 in the manner described in said co-pending application. Therein it is shown that a signal representing a binary zero consists of a tone burst of a predetermined frequency lasting less than a predetermined period of time T. A logical one is represented by a tone burst of said predetermined frequency lasting greater than the predetermined time T. The apparatus of FIG. 5 will provide BCD representations of the index number recorded on the tape of cassette 19 to the preferred embodiment of the present invention shown in FIG. 5. It is to be understood that the circuitry shown in FIG. 5 is to be substituted for the circuitry shown in block 27 of FIG. 4 thus providing the preferred embodiment of the present invention with an alternate source of signals. FIFO register 31' corresponds to FIFO register 31 of FIG. 4 and is of the same type. Lines 46' and 116' are to be connected to lines 46 and 116 shown in FIG. 4, respectively. Thus, it will be appreciated that the circuitry shown in block 27 of FIG. 4 and the circuitry shown in FIG. 5 are alternate embodiments for blocks 10 and 11 as shown in FIG. 1.

It is assumed that the tone bursts of predetermined frequency are recorded in four groups of four, each four bursts corresponding to a BCD representation of a decimal digit. Further assume that within each four bit BCD number, the least significant bit is recorded first and the most significant bit is recorded last.

The tone bursts recorded on the record medium of cassette 19 are detected by playback head 121 and amplified by amplifier 122. The output of amplifier 122 is provided along line 123 as the input to phase locked loop 125. As will be known to those skilled in the art, phase locked loops which provide a logical output corresponding to whether or not the loop is in a locked condition are available as integrated circuits. One such type is the commonly-available type 567 tone decoder. Phase locked loop 125 provides an inverted LOCKED output 126 which provides a logical zero whenever the signal on line 123 is within the frequency range of phase locked loop 125 and provides a logical one output when the loop is not in a locked condition.

Phase locked loop 125 is tuned to the predetermined frequency of the tone burst recorded on the recording medium of cassette 19 and thus phase locked loop 125 will be locked during the presence of a tone burst detected by playback head 121 and will not be locked during the absence of these tone bursts.

The inverted LOCKED output 126 is provided to point 127 which is connected to lines 128 and 129.

Line 128 is the input to negative edge triggered one shot multivibrator 130 which has an output provided along line 131 to lines 132 and 133. Line 132 is connected to the clock input (CLK) of a negative edge triggered serial in parallel out four bit shift register 135. Shift register 135 has a serial input connected to line 136. As will be known to those skilled in the art the logic state present on line 136 will be shifted into the first memory location of shift register 135 when a negative going edge appears on line 132 and the previous contents of each memory location of shift register 135 will be shifted to the next contiguous memory location, the contents of the last memory location being shifted out of the register. As shown in FIG. 5, lines 143-146 carry the parallel outputs of shift register 135, line 143 representing the first bit and line 146 representing the fourth bit.

The parallel outputs of shift register 135 are provided as inputs to FIFO register 31'. FIFO register 31' has a SHIFT IN input 32' which is controlled by positive edge triggered one shot multivibrator 137. One shot 137 is triggered by the output of NOR gate 138. The sequence of data entry into FIFO register 31' is controlled by binary counter 140 which is enabled or disabled by flip-flop 139.

OPERATION OF THE TAPE READER CIRCUITRY

Recall that the signals recorded on the recording medium of cassette 19 which will appear on line 123 are tone bursts of a predetermined frequency that are either greater than or less than a predetermined period of time T. Those bursts that are of a duration less than time T correspond to a logical zero and those bursts greater than time T correspond to a logical one. The period of negative edge triggered one shot 130 is selected to be predetermined time T.

When a tone burst appears on line 123 phase locked loop 125 becomes locked on the predetermined frequency and output 126 goes to its logical zero state. The transistion from one to zero at output 126 is provided along line 128 as the input to negative edge triggered one shot 130 and thus one shot 130 is triggered. Since the period of one shot 130 is predetermined time T and it is known that phase locked loop 125 will remain locked for a time either less than time T or greater than time T, it will be apparent that a test of locked output 126 on the falling edge of the output of one shot 130 will determine whether the tone burst which triggered one shot 130 represents a logical zero or a logical one.

If the burst represents a logical zero, output 126 will have returned to its logical one state prior to the appearance of a falling edge on line 131 indicating that one shot 130 has timed out. Since the falling edge on line 131 is provided along line 132, this edge will trigger shift register 135. However, since output 126 has returned to its logical one state prior to the clocking of shift register 135, this logical one will be provided along line 129 and will be inverted to a logical zero by inverter 150. This zero appears on line 136 at the serial input to shift register 135. It may therefore be seen that when the tone burst which appears on line 123 corresponds to a logical zero, output 126 will have returned to its logical one condition (since the burst will have ended) before one shot 130 times out. This logical one at output 136 will appear as a logical zero on line 136 due to inverter 150 and a logical zero will be shifted into register 135 when one shot 130 times out.

From the above description of entry of a logical zero into shift register 135 it will be apparent that a logical one will be shifted into register 135 when the tone burst appearing on line 123 is of a duration greater than time T. In this instance phase locked loop 125 will still be locked when one shot 130 times out and thus a logical zero will be present at point 127 which is inverted to a logical one at point 136 and thus a one is shifted into register 135 when the falling edge appears on line 132. Note that LOCKED output 126 is connected through lines 129 and 151 to the clock input of binary counter 140. This output is further connected by line 152 to the clock input of flip-flop 139.

Assume that the circuitry of FIG. 5 begins with flip-flop 139 in a cleared state and binary counter 140 in its zero count state. Therefore line 155 from flip-flop 139 will carry a logical one and (assuming that one shot 137 has long since timed out) line 156 will carry logical zero. This condition will maintain a logical one on line 46'.

When the operator of central control unit 120 initiates a read operation begin read pulse generator 157 provides a positive pulse along line 158 to the direct set input of flip-flop 139. This causes a logical zero to appear on line 155 which maintains a logical one on line 46' due to the presence of NAND gate 160. The setting of flip-flop 139 causes a logical one to appear on line 159 enabling binary counter 140.

Since binary counter 140 is positive edge triggered, it will increment its count at the end of each tone burst recorded on the tape of cassette 19 since the end of each tone burst will correspond to a zero to one transistion at output 126. Thus it may be seen that binary counter 140 will count at the end of each tone burst without regard to whether the burst represents a logical zero or a logical one. Since some time before or after the end of each tone burst to appear on line 123, the input present on line 136 is shifted into shift register 136 is shifted into shift register 135, it will be apparent that four bits must be serially shifted into register 135 and then all four bits must be shifted in parallel into FIFO register 31'. Similarly the fifth through eighth bits to be shifted serially into register 135 must be set up on lines 143-146 and then shifted in a parallel fashion into FIFO register 31'. In order to accomplish this binary counter 140, flip-flop 139, NOR gate 138 and one shot 137 are provided. One shot 137 is selected so that it has a short period compared with predetermined time period T.

Since counter 140 is triggered at the end of a pulse representing a digital bit, counter 140 will make its transistion from zero to one at the end of the pulse representing the first digital bit and make its transistion from three to four (binary 011 to binary 100) at the end of the tone burst representing the fourth digital bit. Lines 161 and 162 carry the two least significant bits of binary counter 140. As will be known to those skilled in the art, the least significant bits of binary counter 140 will both be equal to zero only when the counter is in its zero, four, eight, and twelve counts. Thus at the end of the tone burst representing the fourth bit to appear on line 123, both lines 161 and 162 will be zero and the output of NOR gate 138 will be determined by the logic state present on line 133. Line 133 will become a zero when one shot 130 times out a period time T after the fourth tone burst began. When a logical zero appears on line 133 all inputs to NOR gate 138 will be zero and a logical one will appear as the output of NOR gate 138 triggering one shot 137. Since the inverted output of one shot 137 is provided to SHIFT IN input 32' of FIFO register 31' a transistion from one to zero will occur at SHIFT IN input 32'. When one shot 137 times out a transistion from zero to one will appear at shift in input 32' thus shifting the data present on lines 143–146 into FIFO register 31'. Thus it may be seen that the timing out of positive edge triggered one shot 137 is the event which shifts data into FIFO register 31' and therefore a second constraint on the period of one shot 137 will be apparent. The period of one shot 137 is constrained to be short as compared to predetermined time period T but greater than or equal to the settling time required by shift register 135 for valid data to appear on lines 143–146 after the shift register has been clocked.

The necessity for this constraint will be apparent to those of ordinary skill in the art. If the fourth pulse to appear on line 123 represents a logical one and is thus of a duration greater than predetermined time T no timing problem is presented. This is because one shot 130 will have timed out thus shifting a logical one into shift register 135 prior to the end of the tone burst which clocks counter 140 from its three count to its four count.

However, if the fourth tone burst to appear on line 123 represents a logical zero, the end of this tone burst clocks counter 140 from its three count to its four count and thus the falling edge to appear on lines 131 and 133 when one shot 130 times out will clock shift register 135 and trigger one shot 137. Since data is shifted into FIFO register 31' at the end of the period of one shot 137 this period must be long enough to allow the parallel outputs of shift register 135 to settle prior to timing out of one shot 137 at which time a zero to one transistion appears at SHIFT IN input 32' shifting four bits of data into FIFO register 31'.

As tone bursts continue to appear on line 123 the fifth through eighth bits are shifted into shift register 135 while the first through fourth bits are shifted out and disappear. At the end of the eighth tone burst to appear on line 123, counter 140 counts from its seven count to its eight count and therefore lines 161 and 162 are both again equal to zero and the parallel shifting of four bits into FIFO register 31' occurs as described above. In a similar manner, bits nine through twelve representing the third binary coded decimal digit of the index signal are shifted into FIFO register 31'.

Operation continues as described above through the shifting of the fifteenth bit into shift register 135. At the end of the tone burst representing the fifteenth bit, binary counter 140 counts from its fourteen state to its fifteen state (binary 1111) and a logical one appears at the ripple carry (RC) output 165 of counter 140. Note that ripple carry output 165 has been equal to zero during the zero through fourteen counts of counter 140 and thus during these counts a zero has been provided along line 166 to the K input of flip-flop 139. Since the J input of flip-flop 139 is grounded and a zero has been provided to the K input, flip-flop 139 has remained set (since it was directly set at the initiation of the read operation) during counts zero through fourteen of counter 140. During count 15 a logical one is provided along lines 166 to the K input of flip-flop 139 thus assuring that the flip-flop will be cleared upon the next positive going edge to appear on line 152. Recall that line 152 is connected to line 151 thereby assuring that counter 140 and flip-flop 139 are triggered on the same clock signal.

At the end of the sixteenth tone burst to appear on line 123 a clock signal appears on lines 151 and 152. This clock signal causes counter 140 to count from fifteen to zero (binary 1111 to binary 0000) and causes flip-flop 139 to be cleared. Since a return to zero for binary counter 140 assures that lines 161 and 162 are both equal to zero, it may be seen that the last four bits representing the fourth binary coded decimal digit are shifted into FIFO register 31' in the same manner the preceding twelve bits have been shifted therein. FIFO register 31' now contains all four binary coded decimals and the eject and print operation is ready to begin.

The clearing of flip-flop 139 at the end of the sixteenth tone burst to appear on line 123 causes a zero to appear on line 159 thus disabling counter 140. The clearing of flip-flop 139 also provides a logical one on line 155 as one input to NAND gate 160. When one shot 137 triggers for the fourth time, a logical one will appear on line 156 for the period of time equal to the period of one shot 137. Therefore, for the first time in the entire sequence described, both inputs to NAND gate 160 will be ones and a logical zero pulse equal in duration to the period of one shot 137 will appear on line 46'. As noted on FIG. 5 line 46' is to be connected to line 46 of FIG. 4 and this negative going pulse will initiate the printing operation of the preferred embodiment of the present invention.

When one shot 137 times out a logical zero appears on line 156 and NAND gate 160 will again establish a logical one on line 46'. Flip-flop 139 will remain cleared until it is reset by a pulse from begin read pulse generator 157 at the beginning of a new read cycle. It is to be noted that this state corresponds to the assumed initial conditions described above and is a stable state which will prevail until the direct setting of flip-flop 139.

The foregoing description of the preferred embodiment of the present invention has been by way of example and it will be obvious to those skilled in the art that other embodiments of the present invention are possible within the scope of the following claims.

I claim:

1. In a central dictation system having a central control unit, at least one recorder for recording dictation on each of a plurality of recording media; a plurality of tape carriers, one of said plurality of tape carriers carrying within one of said plurality of recording media and having an outer surface at least partially enclosing said one of said plurality of recording media, indexing means for providing indexing signals relating to dictation recorded on said plurality of recording media; signal recording means for recording said indexing signals on said one of said plurality of recording media carried within said one of said plurality of tape carriers when said one of said plurality of tape carriers is in recording interrelationship with said signal recording means, playback means selectively operable for providing reproduced indexing signals corresponding to said indexing signals recorded on said one of said plurality of recording media carried within said one of said plurality of tape carriers; eject means for removing said one of said plurality of tape carriers from said recording interrelationship with said playback means; the improvement of a carrier labeling apparatus comprising:

label means disposed on said outer surface of said one of said plurality of tape carriers; and inscribing means for inscribing visible indicia characteristic of said reproduced indexing signals on said label means in response to operation of said eject means.

2. The carrier labeling apparatus of claim 1 wherein said labeling means comprises a material characterized by changing of color in response to the application of heat to said material; and said writing means comprises a thermal write head.

3. The carrier labeling apparatus of claim 2 further including matrix encoding means operatively connected with said playback means for providing a plurality of row signals in response to said reproduced indexing signals;

said matrix encoding means being operatively connected to sequentially provide each of said plurality of row signals to said thermal write head in response to the operation of said eject means.

4. In a dictation system having means for selectively recording dictation as voice generated signals and control information as nonvoice generated signals on a recording medium in a housing having an outer surface, said housing being disposed in a dictation recorder comprising eject means for removing said recording medium from recording relationship with said recorder in response to an eject signal;

means responsive to said eject signal and to said nonvoice generated signals recorded on said recording medium for rendering indicia having a predetermined relationship to said voice generated signals visible on said outer surface of said housing.

5. In a reproducing apparatus for transducing recorded signals recorded on a recording medium within a discrete tape carrier, said apparatus having an ejection means for discharging said tape carrier therefrom, the combination therewith of labeling means disposed on said tape carrier;

decoding means associated with said reproducing apparatus for providing a plurality of indicia signals in response to said recorded signals when said recorded signals have a predetermined characteristic;

inscribing means operatively connected with said decoding means for inscribing visible indicia on said labeling means in response to said indicia signals;

matrix encoding means operatively connected with said decoding means for providing a plurality of row signals in response to said indicia signals; and said matrix encoding means being operatively connected to sequentially provide each of said plurality of row signals to said inscribing means in response to the operation of said ejection means.

6. In a dictation system for recording dictation on one of a plurality of recording media, each of said plurality of recording media being within one of a plurality of record carriers in a recorder, said recorder being conditioned to record dictation when one of said plurality of record carriers is in recording interrelationship therewith and including eject means for removing one of said plurality of record carriers from said recording interrelationship, the improvement of:

signal generating means for providing print signals to a printing head in response to said eject means becoming operative; and a plurality of print receptive means disposed on said plurality of record carriers for providing visible indicia in response to said print signals.

7. The dictation recording system of claim 6 further including matrix encoding means operatively connected with said signal generating means for providing a plurality of row signals in response to said print signals;

said matrix encoding means being operatively connected to sequentially provide each of said plurality of row signals to said print head in response to the operation of said eject means.

8. The dictation recording system of claim 7 wherein said plurality of row signals are printed on said print receptive means in spaced relationship to each other in response to movement of said record carrier caused by operation of said eject means.

9. In a dictation system including at least one recorder for recording dictation on a recording medium disposed in a discrete tape carrier, said tape carrier including an outer surface at least partially enclosing said recording medium, indexing means for providing indexing signals relating to dictation recorded on said recording medium; signal recording means for storing said indexing signals when said tape carrier is in recording interrelationship with said recorder; eject means for removing said tape carrier from said recording interrelationship with said recorder; the improvement of a carrier labeling apparatus comprising:

label means disposed on said outer surface of said tape carrier;

signal reproducing means operable for providing reproduced indexing signals corresponding to said indexing signals stored by said signal recording means in response to said eject means becoming operative; and inscribing means for inscribing visible indicia characteristic of said reproduced indexing signals on said label means in response to operation of said eject means.

* * * * *